United States Patent [19]

Strott et al.

[11] Patent Number: 5,057,811
[45] Date of Patent: * Oct. 15, 1991

[54] ELECTROTHERMAL SENSOR

[75] Inventors: Douglas B. Strott; Timothy White, both of Attleboro; Keith W. Kawate, Attleboro Falls, all of Mass.; Thomas Wiecek, Somerset, N.J.; Carleton M. Cobb, III, East Walpole; Sepideh H. Nott, Fall River, both of Mass.

[73] Assignee: Texas Instruments Incorporated, Dallas, Tex.

[*] Notice: The portion of the term of this patent subsequent to Sep. 12, 2006 has been disclaimed.

[21] Appl. No.: 289,294

[22] Filed: Dec. 22, 1988

[51] Int. Cl.⁵ ............................................ H01C 7/10
[52] U.S. Cl. .................................. 338/22 R; 338/25; 361/103
[58] Field of Search .................. 338/22 R, 22 SD, 25, 338/28; 361/103, 93

[56] References Cited

U.S. PATENT DOCUMENTS

| | | | |
|---|---|---|---|
| 4,023,094 | 5/1977 | Adams | 338/28 X |
| 4,041,440 | 8/1977 | Davis et al. | 338/22 R X |
| 4,510,482 | 4/1985 | McClanahan et al. | 361/103 X |
| 4,729,852 | 8/1988 | Hata | 338/22 R X |
| 4,772,866 | 9/1988 | Willens | 338/22 R X |
| 4,806,900 | 2/1989 | Fujimori et al. | 338/22 R |
| 4,866,559 | 9/1989 | Cobb, III et al. | 361/103 |

Primary Examiner—Marvin M. Lateef
Attorney, Agent, or Firm—John A. Haug; James P. McAndrews; Melvin Sharp

[57] ABSTRACT

An electrothermal sensor is shown having an electrically conductive substrate, an electrically insulating layer disposed on the substrate, a first thermistor disposed on a central region of the electrically insulating layer, a second thermistor disposed adjacent an edge of the electrically insulating layer, an electrical coupling device on the electrically insulating layer for coupling the first and second thermistors externally of the electrically insulating layer and a pair of electrical connecting devices coupled to the substrate and passing through the electrically insulating layer, the first thermistor being disposed between the pair of electrical connecting devices.

13 Claims, 2 Drawing Sheets

ELECTROTHERMAL SENSOR

BACKGROUND OF THE INVENTION

1. Field of the Invention

This invention relates to an electrothermal sensor which is used as a thermal analog for a wire to be protected against thermal buildup.

2. Brief Description of the Prior Art

Aerospace solid state power controllers (SSPC) require a low cost, reliable electrothermal sensor to serve as a thermal analog to the wires to be protected by the SSPC. Prior art sensors of this type, as shown in the commonly assigned copending application, Ser. No. 07/224,153, filed July 26, 1988, now U.S. Pat. No. 4,866,559 issued Sept. 12, 1989 utilize nickel on polyimide thermistors which are adhesively bonded to a heater/shunt, the wires being delicately soldered to the thermistor contact pads. Each sensor of this type which has been proposed has to be made individually. It is readily apparent that such sensors are relatively expensive to fabricate, particularly in matching thermistor components of the sensors. It is therefore apparent that the art seeks an electrothermal sensor having the attributes of the prior art which can be fabricated more economically.

SUMMARY OF THE INVENTION

In accordance with the present invention, this problem of the prior art is minimized and there is provided a method for making an electrothermal sensor and the sensor itself utilizing the wafer of the heater shunt, hybrid-type processing and subsequent separation into individual surface mounted devices that can be flip mounted. An alternative to flip mounting is assembly into an insert-molded lead frame.

Briefly, in accordance with a first embodiment of the invention, a shunt is initially provided in the form of a high electrical resistance layer having good temperature stability of the electrical resistance, a preferred material displaying such properties being Kovar, a nickel iron alloy. Bumps for electrical connection to the shunt are positioned on a face on opposite sides thereof and secured to the surface of the shunt. These bumps are formed of electrically conductive material, preferably a heavy plate of copper dipped in solder. A first electrically insulating layer, typically about 0.001 inches thick and preferably of any conventional electrically insulating glass commonly used in thick film technology and having a coefficient of thermal expansion (CTE) substantially the same as that of the shunt is formed over the shunt with the bumps extending therethrough by standard procedure, such as by thick film techniques.

A first thermistor is then formed on and in the central region of the first electrically insulating layer by standard methods, such as by thick film techniques, thin film techniques, sputtered thin film techniques, metallo-organic techniques or the like. This thermistor is a high resistance region formed preferably of any conventional thick film thermistor material embodying metal and other inorganic oxides or the like in a glassy matrix. Other conventional materials, such as nickel, iron or platinum can be used. Lines extending from the first thermistor to a second set of bumps for external connection thereto are formed in known manner, such as by the techniques used in thermistor formation, preferably of palladium/silver or the like. Photochemical etching is required for fine thermistor and/or heater lines to provide the desired high resistances. The pair of bumps for connection to the ends of the lines connected to the thermistor are secured to the surface of the first electrically insulating layer.

A third pair of bumps similar to the second pair of bumps and formed along therewith is connected to the ends of conductors on said first electrically insulating layer which connect together two smaller thermistors formed at opposing edge regions of said first electrically insulating layer by the techniques described hereinabove. These smaller thermistors are preferably formed of the same material as said first thermistor and, in combination, are equal in resistance to the resistance of the first thermistor.

A second electrically insulating layer, preferably of glass and having a coefficient of thermal expansion (CTE) substantially the same as that of the first electrically insulating layer, is formed in the manner described hereinabove for the first electrically insulating layer and disposed over the first electrically insulating layer as well as the thermistors and the conductors thereon. The three sets of bumps extend through the second electrically insulating layer, this second layer being provided to protect the thermistors and conductors as well as to plug up any pinholes or the like existing in the first electrically insulating layer. A non-oxidizing nitrogen atmosphere or a protective coating may be provided to avoid metal oxidation during processing of Kovar materials and the like. The sensor is then secured to an alumina board or the like with the shunt layer being positioned remote from the board.

In operation, current will enter the shunt via the bumps on one side thereof, this current using the shunt as a current path and exiting from the bumps on the opposite side of the shunt. The shunt heats up due to the $I^2R$ heating therein and acts as a heater. The bulk of the heating takes place in the central region of the shunt as opposed to the edge portions thereof which, due to the heat sinking effect of the shunt, remain at essentially ambient temperature. This heating causes the first large thermistor to heat up relative to the two smaller thermistors which remain at substantially ambient temperature. This temperature difference which is measured in terms of change in resistance of the thermistors via parameter measurements obtained at the bumps spanning the respective thermistors and correlates to the amount of energy in the analog wire being monitored for prevention against burn out. When the difference in resistance relative to the first thermistor exceeds some predetermined value, the measured parameter will indicate this and the system will provide a desired indication, alarm or the like so that the circuit containing the actual, as opposed to the analog wire can be shut down or otherwise operated upon.

In accordance with a second embodiment of the invention, a ceramic substrate, preferably aluminum oxide, is provided and a coating of palladium/silver is selectively formed thereon by standard techniques. Current is introduced thereto at one end and withdrawn at the opposite end to provide a heating element in the portion of the substrate containing the heater. A glass dielectric is then formed over at least the heater and preferably the entire surface of the substrate containing the heater by standard techniques. Thick film thermistors and connectors therefor are then formed on the dielectric, one over or closely adjacent the heater and the second at a predetermined distance therefrom. The temperature difference between the two thermistor locations will result different resistances of the thermistors which can be used as an indication of the current in the heater in well known manner. Proper sizing of the substrate and the heater and proper location of the thermistors can allow a unity of current/time/temperature characteristics to be realized. Such a device can be used as the sensing element of a solid state power controlling device.

In accordance with a third embodiment of the invention, a conductor in the form of a heater and pads are formed on a ceramic substrate such as steatite. A dielectric is then selectively formed in two separate layers over the substrate with apertures therein over the pads and opposite ends of the heater. Conductors are then formed over the dielectric and negative temperature coefficient of resistance (NTC) or positive temperature coefficient of resistance (PTC) thermistors are formed in contact with certain ones of the conductors, other ones of the conductors contacting the pads on the substrate or the heater. A polymer overcoat is applied over the entire substrate for mechanical protection except for the solder pads to permit contact thereto. The ceramic substrate is preferably steatite and the dielectric is preferably glass as noted previously.

The heater as set forth in the third embodiment can have any one of many desired shapes to be operable. However, in the case of most shapes utilized it has been found that the heater develops hot spots in certain locations, this being undesirable since, it is believed, these hot spots result in unanticipated heat transfer variations and incorrect trip times. Where the heater is in the shape of a horseshoe with a long slot portion, it was found, for example, that an undesired hot spot developed at the end of the slot. Accordingly, designs were investigated wherein the hot spots could be eliminated or at least minimized. In this regard, it was found that the hot spot at the end of the slot in the horseshoe shaped heater was minimized by decreasing the length of the slot. A still better result was obtained by retaining the long slot and forming a triangular region at the end of the slot. A yet better result was obtained by forming a rectangle at the end of the slot and also forming a cut out region forward of the rectangle on both sides of the slot. The new geometries, in all cases, appears to minimize the buildup of current around corners either by enlarging the available length around the corners or by directing current flow away from a small area corner whereby the current path is spread out rather that concentrated at the corners or bends. The new geometries as set forth hereinabove provide more generally uniform temperature throughout the heater with the elimination or minimization of hot spots.

DESCRIPTION OF THE PREFERRED EMBODIMENTS

Figure 1:
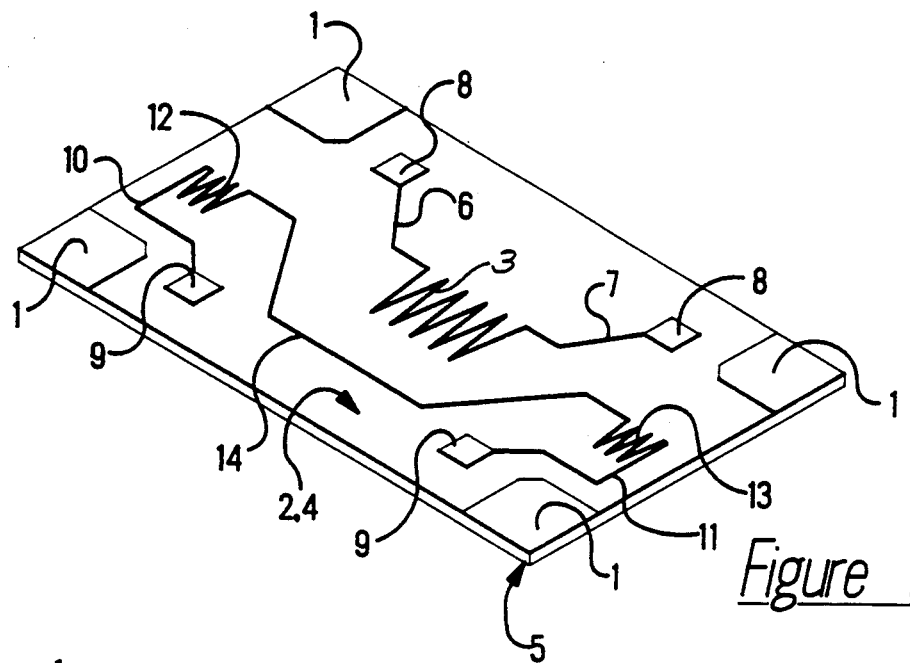
FIG. 1 is an elevational view of an electrothermal sensor in accordance with a first embodiment of the invention.
Figure 2:
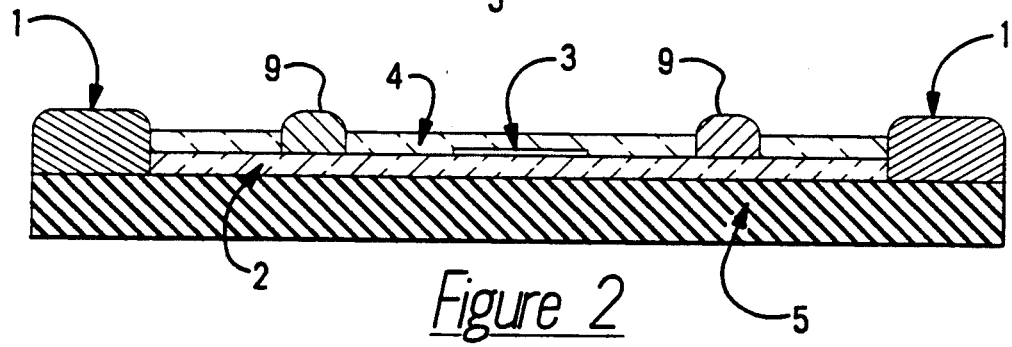
FIG. 2 is a cross sectional view of the electrothermal sensor of FIG. 1.

Referring first to FIGS. 1 and 2, there is shown an electrothermal sensor in accordance with a first embodiment of the invention. The sensor includes a Kovar shunt 5 in the form of a high electrical resistance layer having good temperature stability of the electrical resistance. Bumps 1 for electrical connection to the shunt 5 are positioned on opposite sides thereof and secured to the surface of the shunt, the bumps being formed of electrically conductive material, preferably a heavy plate of copper dipped in solder. A first glass electrically insulating layer 2 of an conventional glass insulating material used in thick film technology having a coefficient of thermal expansion (CTE) substantially the same as that of the shunt 5 and typically of a thickness in the range from 0.0005 to 0.002 inches is formed over the shunt with the bumps 1 extending therethrough by standard procedure, such as by thick film techniques.

A first thermistor 3 is then formed on and in the central region of the first electrically insulating layer 2 by standard methods, such as by thick film techniques, thin film techniques, sputtered thin film techniques, metallo organic techniques or the like. This thermistor 3 is a high resistance region formed preferably of any thick film thermistor embodying metal and other inorganic oxides or the like in a glassy matrix adapted to display greater than 1000 ppm/°C. resistance change with temperature change. Lines 6 and 7 extending from the first thermistor 3 to a second set of bumps 8 for external connection thereto are formed in known manner, such as by the techniques used in thermistor formation, preferably of palladium/silver or the like. Photochemical etching is utilized in the event fine thermistor and/or heaterlines are required to provide a desired high resistance. The pair of bumps 8 for connection to the ends of the lines 6 and 7 are secured to the surface of the first electrically insulating layer 2.

A third pair of bumps 9, similar to the second pair of bumps 8 and formed along therewith, is connected to the ends of conductors 10 and 11 on the first electrically insulating layer 2 which connect together two smaller thermistors 12 and 13 formed at opposing edge regions of the first electrically insulating layer 2 by the techniques described hereinabove. The thermistors 12 and 13 are connected together via a conductor 14 of the same material and formed simultaneously with the conductors 10 and 11. These smaller thermistors 12 and 13 are preferably formed of the same material as the first thermistor and, in combination, are equal in resistance to the resistance of the first thermistor.

A second glass electrically insulating layer 4 having a coefficient of thermal expansion (CTE) substantially the same as that of the first electrically insulating layer 2, is formed in the manner described hereinabove for the first electrically insulating layer and disposed over the first electrically insulating layer as well as the thermistors 3, 12 and 13 and the conductors 6, 7, 10, 11 and 14 thereon. The three sets of bumps 1, 8 and 9 extend through the second electrically insulating layer 4, this second insulating layer being provided to protect the thermistors and conductors on the first insulating layer as well as to plug up any pinholes or the like existing in the first electrically insulating layer. A non-oxidizing nitrogen atmosphere or the like or a protective coatings may be provided during fabrication to avoid metal oxidation of Kovar, copper or silver materials and the like during processing. The sensor is then secured to an alumina board or the like with the shunt layer being positioned remote from the board.

In operation, current will enter the shunt 5 via the bumps 1 on one side thereof of the shunt, this current using the shunt as a current path and exiting from the bumps 1 on the opposite side of the shunt. The shunt heats up due to the $I^2R$ heating therein and acts as a heater. The bulk of the temperature increase takes place in the central region of the shunt as opposed to the edge portions thereof which remain at essentially ambient temperature due to heat sinking and dissipating properties of the shunt. This heating causes the first large thermistor 3 to heat up relative to the two smaller thermistors 12 and 13 which remain at substantially ambient temperature. This temperature difference is measured in terms of change in resistance of the thermistors via parameter measurements obtained at the bumps 8 and 9 spanning the respective thermistors 3, 12 and 13 and correlates to the amount of energy in the analog wire being monitored for prevention against burn out. When the difference in resistance of the first thermistor 3 and thermistors 12 and 13 exceeds some predetermined value, the measured parameters will indicate this and the system will provide a desired indication, alarm or the like so that the circuit containing the actual, as opposed to the analog, wire can be shut down or otherwise operated upon.

Figure 3:
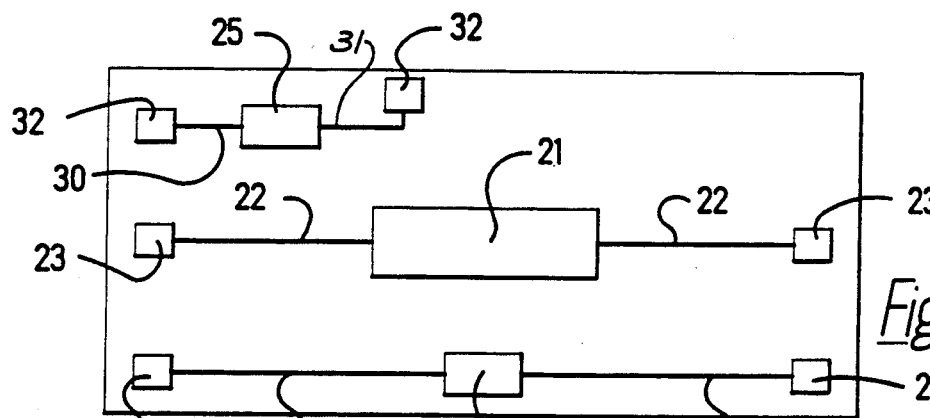
FIG. 3 is a top view of an electrothermal sensor in accordance with a second embodiment of the invention.
Figure 4:
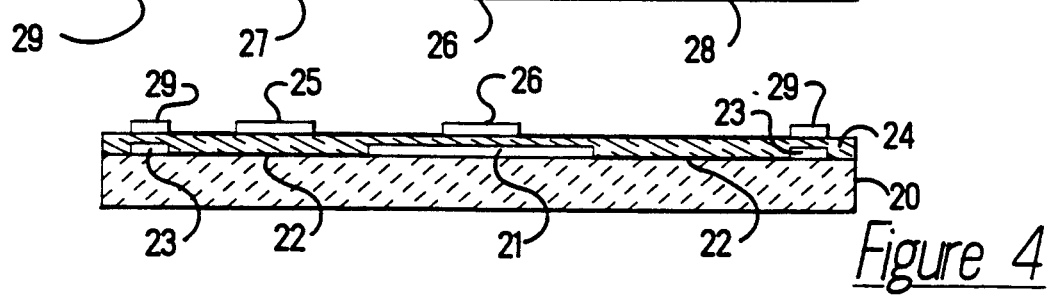
FIG. 4 is a cross sectional view of the electrothermal sensor of FIG. 3.

In accordance with a second embodiment of the invention, as shown in FIGS. 3 and 4, a ceramic substrate 20, preferably aluminum oxide, is provided and a coating of palladium/silver is selectively formed thereon by standard techniques to form a heating element 21 with conductors 22 extending to pads 23 at opposite edges of the substrate. A glass dielectric layer 24 is then formed over at least the heater 21 and preferably the entire surface of the substrate 20 containing the heater by standard techniques. Thick film thermistors 25 and 26 are then formed on the dielectric 24, thermistor 26 over or closely adjacent the heater and thermistor 25 at a predetermined remote distance therefrom. The thermistor 26 is coupled via lines 27 and 28 to pads 29 whereas thermistor 25 is coupled vial line 30 and 31 to pads 32. The temperature difference between the two thermistor locations will result in different resistances of the thermistors which can be used as an indication of the current in the heater in well known manner.

Figure 5:
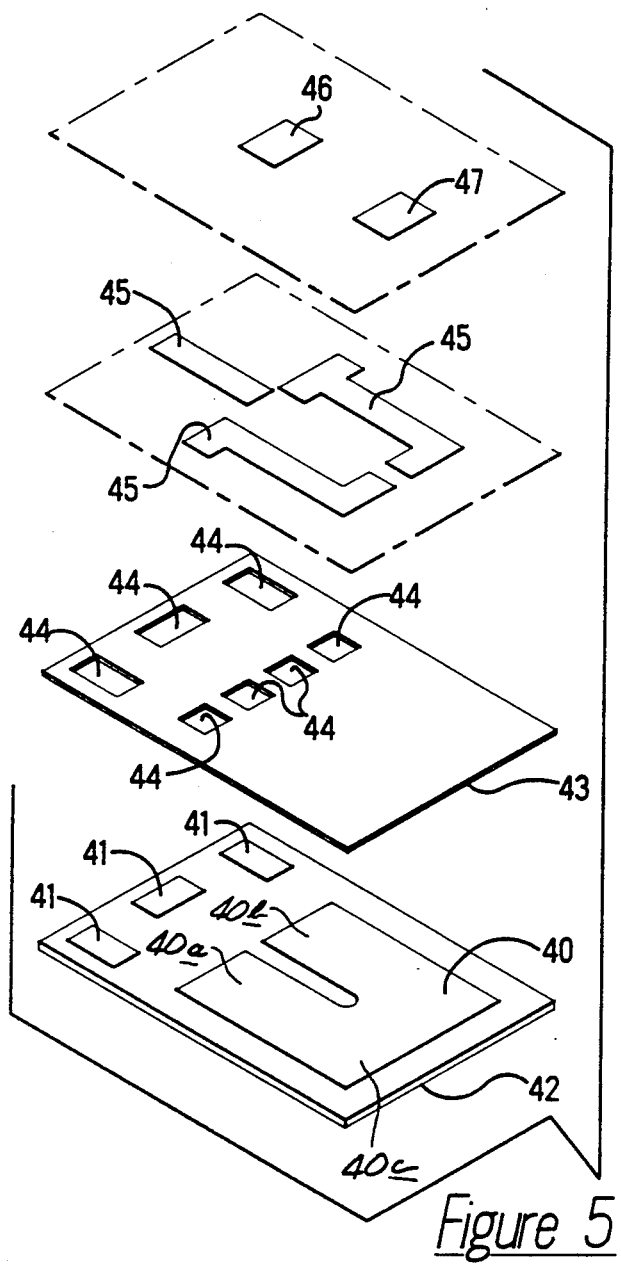
FIG. 5 is an exploded view of an electrothermal sensor in accordance with a third embodiment of the invention.

In accordance with a third embodiment of the invention as shown in FIG. 5, a conductor in the form of a heater 40 and thermistor connector pads 41 is formed on a ceramic substrate 42. A dielectric 43 is then selectively formed in two separate layers over the substrate with apertures 44 therein disposed over the pads 41 and over opposite ends of the heater 40. Conductors 45 are then formed over the dielectric 43 and negative temperature coefficient of resistance (NTC) or positive temperature coefficient of resistance (PTC) thermistors 46 and 47 are formed in contact with certain ones of the conductors 45, other ones of the conductors contacting the pads 41 on the substrate or the heater 40. A polymer overcoat (not shown) is applied over the entire substrate except for the solder pads for mechanical protection to permit contact thereto. The ceramic substrate is preferably steatite and the dielectric is preferably glass as noted above.

The embodiment of FIG. 5 is formed by printing the heater and pads 40 and 41 onto the substrate 42 in standard manner and firing at about 900° C. for about 10 minutes. The dielectric 43 is then selectively formed over the substrate and conductors in two separate layers, each layer being separately deposited and fired at about 850° C. for about 10 minutes. The conductors 45 are then deposited over the dielectric 43 in standard manner and fired at about 850° C. for about 10 minutes. Then the thermistors 46 and 47 are deposited in standard manner and fired at about 850° C. for about 10 minutes. The polymer overcoat is then applied over the entire substrate except the solder pad apertures 44 and is cured at about 165° C. for about 25 minutes.

Figure 6A:
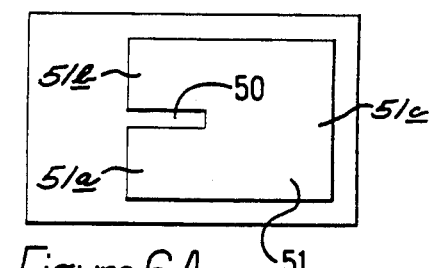
FIGS. 6A through 6C are schematic diagrams of heater shapes in accordance with the present invention.
Figure 6B:
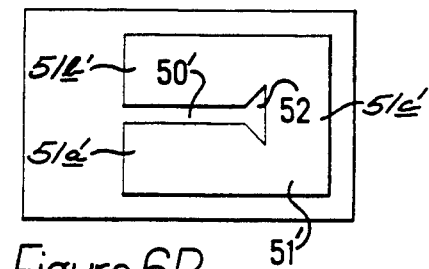
Figure 6C:
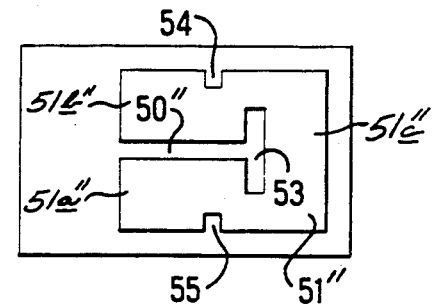

The heater 40 as set forth in the third embodiment (FIG. 5) can have any one of many desired shapes to be operable. However, in the case of most shapes utilized, it has been found that the heater develops hot spots in certain locations. This is undesirable since, it is believed, these hot spots result in unanticipated heat transfer variations and the like and incorrect trip times Where the heater is in the shape of a horseshoe (as shown in FIG. 5) with two leg portions joined by a back portion and with a long slot portion between the two leg portions, it was found, for example, that a hot spot developed at the end of the slot. Accordingly, designs were investigated wherein the hot spots could be eliminated or at least minimized. In this regard, it was found that the hot spot at the end of the slot 50 in the horseshoe shaped heater 51 was minimized by decreasing the length of the slot as shown in FIG. 6A whereby the distance from the end of the slot 50 to the back edge of the back portion 51c was of greater length than the distance across a leg 51a or 51b in a direction normal to the slot. A still better result was obtained as shown in FIG. 6B which shows heater 51' having legs 51a', 51b' joined by back portion 51c' by retaining the long slot and forming a triangular region 52 at the end of the slot 50". A yet better result was obtained as shown in FIG. 6C which shows heater 51" having legs 51a", 51b" joined by back portion 51c" by forming a rectangle 53 at the end of the slot 50" and also forming a cut out region 54 and 55 forward of the rectangle on both sides of the slot. The new geometries, in all cases, appears to minimize the buildup of current around corners either by enlarging the available length around the corners or by directing current flow away from a small area corner whereby the current path is spread out rather that concentrated at the corners or bends. The new geometries as set forth hereinabove provide an essentially constant heat throughout the heater with the elimination or minimization of hot spots.

In another preferred embodiment of the ETS corresponding to any of the preceding embodiments illustrated in FIGS. 1–6, the heater is formed of titanium metal and the sensors comprise either thermistors as previously described, particularly when provided on an alumina insulating layer on the titanium metal, or commercially available temperature transducers which utilize silicon semiconductor devices. In this embodiment of the invention, the titanium shunt and electrically insulator layer as previously described are bonded together by use of any conventional electrically insulative adhesive or the like and electrical connections are made to the sensors by wire bonds or the like using either ball bonding or ultrasonic bonding. Preferably thick film copper pads are screened onto the titanium shunt for electrical attachment of the shunt into a main SSPC circuit or the like. In that arrangement, the thermal conductivity characteristics of titanium metal permit substantial miniaturization of the ETS to facilitate accommodation of the ETS in SSPC device enclosures or the like.

Though the invention has been described with respect to specific preferred embodiments thereof, many variations and modifications will immediately become apparent to those skilled in the art. It is therefore the intention that the appended claims be interpreted as broadly as possible in view of the prior art to include all such variations and modifications.

We claim:

1. An electrothermal sensor particularly useful as a thermal analog to wires to be protected against over-temperature conditions comprising:
   (a) an electrically conductive substrate;
   (b) an electrically insulating layer disposed on said substrate;
   (c) a first thermistor disposed on a central region of said electrically insulating layer;
   (d) a second thermistor disposed adjacent an edge of said electrically insulating layer, said second thermistor comprising first and second electrically interconnected thermistor sections spaced from each other and disposed on opposite sides of said first thermistor;
   (e) means on said electrically insulating layer for coupling said first and said second thermistors externally of said electrically insulating layer; and
   (f) a pair of electrical connecting means coupled to said substrate and passing through said electrically insulating layer;
   (g) said first thermistor being disposed between said pair of electrical connecting means.

2. An electrothermal sensor as set forth in claim 1 further including a second electrically insulating layer disposed over and in contact with said first electrically insulating layer, said first and second thermistors and said means on said electrically insulating layer for coupling said first and second thermistors externally of said electrically insulating layer.

3. An electrothermal sensor as set forth in claim 2 wherein said substrate is formed of a nickel iron alloy, said insulating layer is formed of glass having a temperature coefficient of expansion substantially the same as the nickel iron alloy and said first and second thermistors are selected to display resistance change of at least 1000 ppm/°C. with temperature change.

4. An electrothermal sensor as set forth in claim 1 wherein said substrate is formed of a nickel iron alloy, said insulating layer is formed of glass having a temperature coefficient of expansion substantially the same as the nickel iron alloy and said first and second thermistors are selected to display resistance change of at least 1000 ppm/°C. with temperature change.

5. An electrothermal sensor particularly useful as a thermal analog to wires to be protected against over-temperature conditions comprising:
   (a) an electrically conductive substrate;
   (b) an electrically insulating layer disposed on said substrate, said electrically insulating layer comprising a first electrically insulating portion and a separately formed second electrically insulating portion over and in contact with said first electrically insulating portion;
   (c) a first thermistor disposed on a central region of said electrically insulating layer;
   (d) a second thermistor disposed adjacent an edge of said electrically insulating layer;
   (e) means on said electrically insulating layer for coupling said first and said second thermistors externally of said electrically insulating layer; and
   (f) a pair of electrical connecting means coupled to said substrate and passing through said electrically insulating layer;
   (g) said first thermistor being disposed between said pair of electrical connecting means.

6. An electrothermal sensor as set forth in claim 5 wherein said substrate is formed of a nickel iron alloy, said insulating layer is formed of glass having a temperature coefficient of expansion substantially the same as the nickel iron alloy and said first and second thermistors are selected to display resistance change of at least 1000 ppm/°C. with temperature change.

7. An electrothermal sensor particularly useful as a thermal analog to wires to be protected against over-temperature conditions comprising:
   (a) a ceramic substrate having a top surface;
   (b) a heater having opposite end regions disposed on a top surface of said substrate and electrically conductive pads disposed elsewhere on said top surface of said substrate;
   (c) an electrically insulating layer disposed on and contacting said top surface of said substrate and said heater and having apertures therein aligned with said pads and said opposite end regions of said heater;
   (d) a plurality of conductors disposed on said electrically insulating layer and extending through predetermined ones of said apertures to contact predetermined ones of said pads and said end regions of said heater;
   (e) a first thermistor disposed on said electrically insulating layer disposed closely adjacent to said heater and contacting predetermined ones of said conductors; and
   (f) a second thermistor disposed on said electrically insulating layer remote from said heater and contacting predetermined ones of said conductors.

8. An electrothermal sensor as set forth in claim 7 wherein said substrate is formed of steatite and further including a protective coating over said substrate and said components thereon.

9. An electrothermal sensor as set forth in claim 7 wherein said electrically insulating layer comprises a first electrically insulating portion and a separately formed second electrically insulating portion over and in contact with said first electrically insulating portion.

10. An electrothermal sensor as set forth in claim 7 wherein said heater is in the shape of a "U" having leg portions with a slot therebetween joined by a back portion forming a closed end of the slot, the width of each said leg in a direction normal to said slot selected to be less than the distance from the closed end of said slot to the edge of said back portion in a direction along said slot.

11. An electrothermal sensor as set forth in claim 7 wherein said heater is in the shape of a "U" having leg portions with a slot therebetween joined by a back portion forming a closed end of the slot, the closed end of said slot having a triangular shape with the base of said triangle extending toward said back portion.

12. An electrothermal sensor as set forth in claim 7 wherein said heater is in the shape of a "U" having leg portions with a slot therebetween joined by a back portion forming a closed end of the slot, the closed end of said slot having a substantially rectangular shape extending normal to said slot and a pair of symmetrically positioned grooves, one in each said leg spaced from said rectangle in a direction away from said back portion.

13. An electrothermal sensor as set forth in claim 12 wherein the large side of said rectangle extends normal to said slot and wherein said grooves are of rectangular shape.

* * * * *